(12) United States Patent
Mruk et al.

(10) Patent No.: US 9,163,101 B2
(45) Date of Patent: *Oct. 20, 2015

(54) RUBBER COMPOSITION AND PNEUMATIC TIRE

(75) Inventors: Ralf Mruk, Lipperscheid (LU); Frank Schmitz, Bissen (LU); Robert Fokko Roskamp, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 692 days.

This patent is subject to a terminal disclaimer.

(21) Appl. No.: 13/332,989

(22) Filed: Dec. 21, 2011

(65) Prior Publication Data

US 2013/0160911 A1 Jun. 27, 2013

(51) Int. Cl.
| | |
|---|---|
| C08F 136/06 | (2006.01) |
| C08F 136/08 | (2006.01) |
| C08F 236/10 | (2006.01) |
| C08K 3/08 | (2006.01) |
| C08K 5/3432 | (2006.01) |
| C08K 5/36 | (2006.01) |
| D07B 1/06 | (2006.01) |
| B82Y 30/00 | (2011.01) |
| B60C 9/00 | (2006.01) |

(52) U.S. Cl.
CPC ............ C08F 136/06 (2013.01); C08F 136/08 (2013.01); C08F 236/10 (2013.01); C08K 3/08 (2013.01); C08K 5/3432 (2013.01); C08K 5/36 (2013.01); D07B 1/0666 (2013.01); B60C 2009/0021 (2013.04); B82Y 30/00 (2013.01)

(58) Field of Classification Search
CPC .... C08F 136/06; C08F 236/10; C08F 136/08; C08K 5/3432; C08K 5/36; C08K 3/08; B82Y 30/00; B60C 2009/0021; D07B 1/0666
USPC ........................................................ 524/494
See application file for complete search history.

(56) References Cited

U.S. PATENT DOCUMENTS

| | | | | |
|---|---|---|---|---|
| 4,935,471 | A | 6/1990 | Halasa et al. | 525/359.1 |
| 4,937,290 | A | 6/1990 | Bauer et al. | 525/184 |
| 6,017,980 | A | 1/2000 | Wang et al. | 523/215 |
| 6,365,668 | B1 | 4/2002 | Scholl et al. | 524/575 |
| 7,847,019 | B2 | 12/2010 | David et al. | 525/54.1 |
| 7,943,693 | B2 | 5/2011 | Feher et al. | 524/493 |
| 2010/0230158 | A1 | 9/2010 | Hase et al. | 174/72 A |
| 2010/0319827 | A1 | 12/2010 | Imhoff et al. | 152/458 |
| 2013/0160912 | A1* | 6/2013 | Mruk et al. | 152/517 |
| 2013/0165596 | A1* | 6/2013 | Mruk et al. | 525/332.9 |
| 2014/0148555 | A1* | 5/2014 | Mruk et al. | 525/332.3 |

FOREIGN PATENT DOCUMENTS

JP 2008163239 7/2008 ................ C08F 8/00

OTHER PUBLICATIONS

Kryger, Matt, "Applications of Thiol-ENE Coupling", *Abstract*, Dec. 11, 2008, pp. 1-8, Retrieved from the Internet, http://www.chemistry.illinois.edu/research/organic/seminar_extracts/2008_2009/Matt_Kryger_Chem535_FA_08_Abstract.pdf *whole document*.

Moad, Graeme et al., "Living Radical Polymerization by the RAFT Process", *Australian J. Chemistry* 2005, vol. 58, pp. 379-410, Retrieved from the Internet: URL: http://www.publish.csiro.au,journals/ajc *whole document*.

Harrisson, Simon, "Radical-Catalyzed Oxidation of Thiols by Trithiocarbonate and Dithioester RAFT Agents: Implications for the Preparation of Polymers with Terminal Thiol Functionality", *Macromolecules*, Jan. 13, 2009.

Ohr, Kristi et al., "Redox Behavior of Phenyl-Terpyridine-Substituted Artificial Oligopeptides Cross-Linked by Co and Fe", *Inorganic Chemistry*, pp. 965-974, vol. 46, No. 3 2007.

Gerber, R. Eric et al., β-Mercaptopropionitrile (2-Cyanoethanethiol), *Organic Synthesis*, vols. 10 and 77, pp. 234 and 186.

Lutz, Jean-Francois, "Modular Chemical Tools for Advanced Macromolecular Engineering", *Polymer*, vol. 49, Issue 4, Feb. 18, 2008, pp. 817-824.

Carlise, Joseph E. et al., "Side-Chain Functionalized Polymers Containing Bipyridine Coordination Sites: Polymerization and Metal-Coordination Studies", *Journal of Polymer Science: Part A: Polymer Chemistry*, vol. 42, 2973-2984 (2004).

Brummelhuis, Niels ten et al., "Supporting Information to Thiol#Ene Modification of 1,2-Polybutadiene Using UV Light or Sunlight", pp. Sl-S5.

Brummelhuis, Niels ten et al., "Thiol#Ene Modification of 1,2-Polybutadiene Using UV Light or Sunlight", *Macromolecules*, 2008, 41, pp. 9946-9947, Retrieved from the Internet: URL: http://www.pubs.acs.org *whole document*.

Schubert et al., Angew. Chem. Int. Ed., 2002, vol. 41, p. 2892-2926.

* cited by examiner

*Primary Examiner* — Angela C Scott
(74) *Attorney, Agent, or Firm* — John D. DeLong

(57) ABSTRACT

The present invention is directed to a rubber composition comprising: a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and a metal ion.

The invention is further directed to a pneumatic tire comprising the rubber composition.

13 Claims, 13 Drawing Sheets

RUBBER COMPOSITION AND PNEUMATIC TIRE

BACKGROUND

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitriles, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a β-carbolinyl group, a perimidinyl group, a phenanthrolinyl group or the like.

SUMMARY

The present invention is directed to a rubber composition comprising: a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and a metal ion.

The invention is further directed to a pneumatic tire comprising the rubber composition.

DETAILED DESCRIPTION

Figure 1:
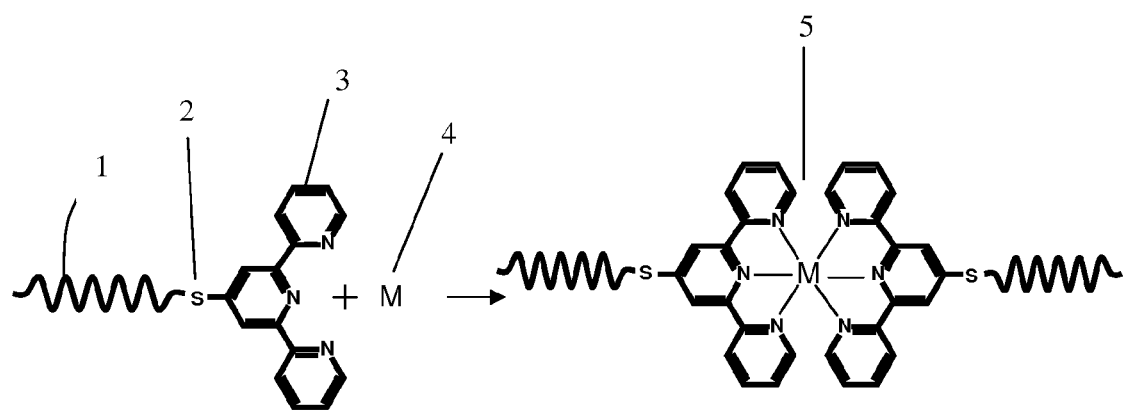
FIG. 1 shows a schematic representation of a coordination complex between a metal ion and a functionalized elastomer.

There is disclosed a rubber composition comprising
a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and a metal ion.

There is further disclosed a pneumatic tire comprising the rubber composition.

In one embodiment, the functionalized elastomer has the structure I

$$X\text{--}[\text{--}Y\text{--}Z]_n \qquad (I)$$

where X is a polymer derived from a monomer comprising at least one conjugated diene monomer and optionally at least one vinyl aromatic monomer; Z is a functional group comprising a multidentate ligand capable of complexing with a metal ion; Y is a divalent group bonded to both X and Z; and n is the number of –[–Y—Z] groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers for use as polymer X are polyisoprene (natural or synthetic), polybutadiene and SBR.

In one embodiment, polymer X may be an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use as polymer X in this invention.

The solution polymerization prepared SBR (S-SBR) suitable for use as polymer X typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used as polymer X. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the functional group Z comprising a multidentate ligand capable of complexing with a metal ion, includes but is not limited to substituted or unsubstituted bipyridinyl groups, substituted or unsubstituted terpyridinyl groups, substituted or unsubstituted phenanthrolinyl groups, and substituted or unsubstituted pyrazinyl groups, and the like.

In one embodiment, the functional group Z comprising a multidentate ligand capable of complexing with a metal ion is selected from the group consisting of substituted or unsubstituted bipyridinyl groups, substituted or unsubstituted terpyridinyl group, substituted or unsubstituted phenanthrolinyl group, or substituted or unsubstituted pyrazinyl group.

In one embodiment, the functional group Z comprising a multidentate ligand capable of complexing with a metal ion is a substituted or unsubstituted terpyridinyl group of formula II, or substituted or unsubstituted bipyridinyl group of formula III or IV

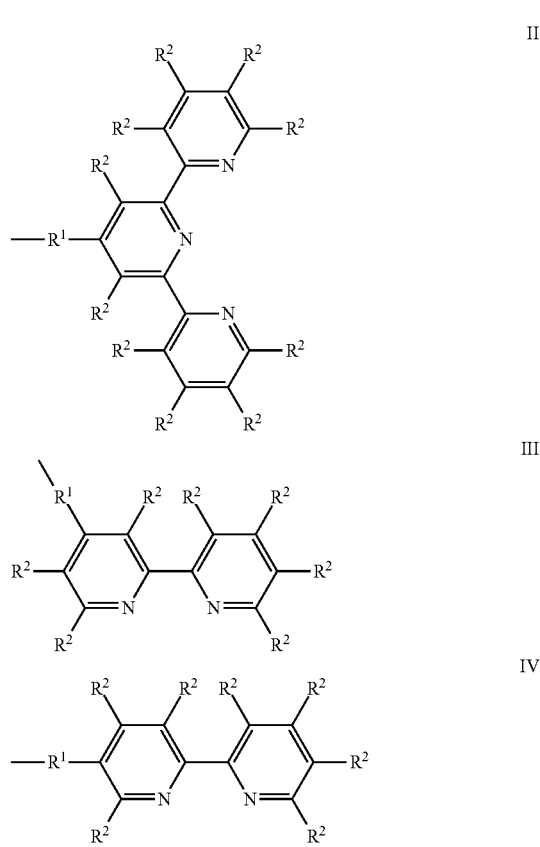

where $R^1$ forms the linkage from Z to Y in formula I and $R^1$ is a covalent bond, C2 to C8 linear alkylene, arylene, alkyl substituted arylene, aryl substituted alkylene, thioalkylene, or thioarylene, and $R^2$ are independently selected from the group consisting of hydrogen, C2 to C6 linear alkyl, and C2 to C6 branched alkyl.

In one embodiment, the functional group Z comprising a multidentate ligand is a substituted or unsubstituted 2,2';6', 2"-terpyridinyl group.

In one embodiment, the functional group Z comprising a multidentate ligand is a substituted or unsubstituted 2,2'-bipyridinyl group.

In one embodiment, the —[Y—Z] group is selected from the group consisting of 6-(2,2';6',2"-terpyridin-4'-ylsulfanyl) hexyl-1-sulfanyl, 2,2';6',2"-terpyridin-4'-ylsulfanyl, and 4-(2,2';6',2"-terpyridin-4'-yl)phenylmethylsulfanyl.

Y is a divalent group bonded to both X and Z. In one embodiment, Y is sulfur or oxygen. In one embodiment, Y is sulfur.

The number n of —[Y—Z] groups bonded to X ranges from about 2 to about 30 in a given copolymer molecule.

By "capable of complexing with a metal ion," it is meant that as part of the functionalized elastomer of formula I, the functional group Z may form a complex structure with a metal ion; such a metal ion may be present for example by addition of a metal salt during mixing of the functionalized elastomer in a rubber composition. Suitable metal ions include those known to complex with ligands, including but not limited to zinc ions, copper ions, iron ions, nickel ions, ruthenium ions, and the like. The complexation of the functional group Z with a metal ion may exist as a complex between a single functional group Z and the metal ion, or as a coordination complex between 2 or more functional groups Z and a metal ion. FIG. 1 shows schematically such a coordination complex between an elastomer (1) shown as a wavy line functionalized through a sulfur linkage (2) with a terpyridine group (3) as the ligand. The addition of a metal ion M (4) is shown to form a coordination complex (5) between the metal ion M (4) and two of the ligand groups (3) of the functionalized elastomer.

The functionalized elastomer may be produced by various methods. In one embodiment, the functionalized elastomer may be produced by functionalizing the polymer X with functional group Z comprising a multidentate ligand capable of complexing with a metal ion. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the –[–Y—Z] grouping, where Y is sulfur, may be linked to the elastomer X through reaction of the thiol HS-Z with vinyl groups of the elastomer X to form a thioether of formula I, where Y is sulfur. Further details of the thiol-ene reaction as it relates to elastomers may be found by reference to U.S. Pat. Nos. 6,365,668 and 7,847,019, both fully incorporated by reference herein.

One step of the method to produce the functionalized elastomer is to obtain as a first polymer X, an elastomer comprising at least one carbon-carbon double bond.

A second step of the method is obtaining a functionalizing agent including a functional group Z comprising a multidentate ligand capable of complexing with a metal ion, and a functional group Y capable of reacting with the carbon-carbon double bond of the first polymer.

A third step of the method is reacting the first polymer X with the functionalizing agent to form the functionalized elastomer. During reacting of the functionalizing agent with the first polymer, the functional group Z is linked to the first polymer through reaction of the functional group Y with the unsaturated carbon-carbon bond of the first polymer.

In one embodiment, the functionalizing agent is reacted with the first polymer in a suitable solvent in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

Figure 2:
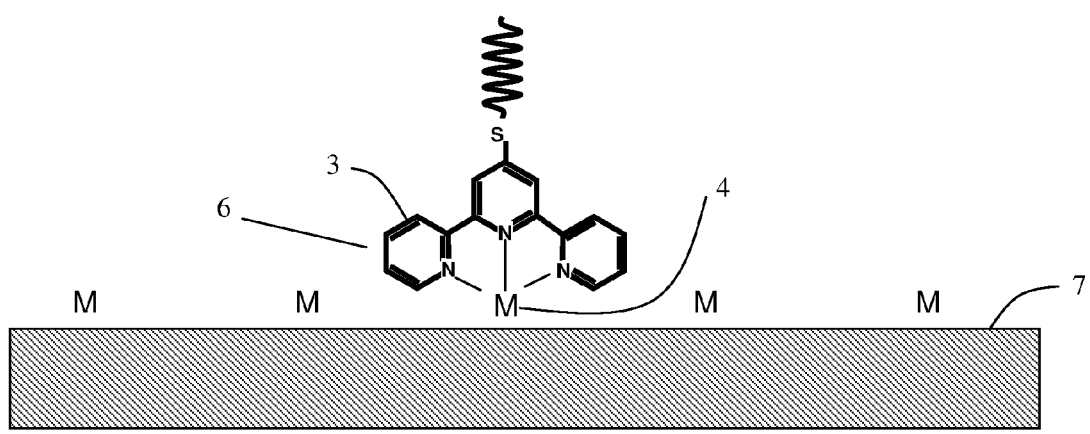
FIG. 2 shows a schematic representation of a coordination complex between a metal ion disposed on a surface and a functionalized elastomer.

In addition to the functionalized elastomer, the rubber composition includes a metal ion. While not wishing to be bound by any theory, when in the presence of the functionalized elastomer, the metal ion may complex with the functionalized elastomer in a manner similar to that illustrated in FIG. 1 and described earlier herein. In FIG. 1, the metal ion M is illustrated as freely associated with the functionalized elastomer, such a through addition of a metal salt to the rubber composition. In another embodiment, the complexation may be as illustrated in FIG. 2. As seen in FIG. 2, the metal ion M (4) is disposed on a surface (7) and forms a complex (6) with the ligand (3). Surface 7 may be the surface of for example a metallic tire cord, a metalated filler such as metalated carbon black or metalated silica, or a metalated short fiber. The interaction of the metal ion with the functionalized elastomer as depicted in FIG. 1 or 2 may result for example in an increase in modulus of the rubber composition, improved interaction with fillers, or improved adhesion of the rubber composition to a reinforcement.

The metal ion is generally added in an amount sufficient to complex with the functionalized elastomer; depending on the amount of functionalized elastomer present in the rubber composition and the number of ligand groups in an elastomer molecule, the amount of metal ion required can be easily determined by one skilled in the art. Amounts of metal ion in excess of, or less than, the stoichiometric amount of metal ion may be used, depending on the desired effect.

In one embodiment, the metal ion includes divalent copper, divalent iron, divalent cobalt, divalent nickel, and divalent ruthenium, i.e., $Cu^{2+}$, $Fe^{2+}$, $Co^{2+}$, $Ni^{2+}$, $Zn^{2+}$ and $Ru^{2+}$.

In one embodiment, the metal ion is added to the rubber composition as a metal salt. In one embodiment, the metal ion is added to the rubber composition as a metal salt including $FeSO_4.7H_2O$, $FeCl_2$, $NiCl_2$, $RuCl_3$, cobalt stearate, zinc stearate, and the like.

In one embodiment, the metal ion is present in the rubber composition as a metal ion disposed on the surface of a metallic tire cord as is known in the art, such as a steel tire cord. Such steel cords may be used for example in reinforcing steel belts in the tire. Suitable steel tire cords may have for example surfaces treated with brass, copper, or cobalt. The rubber composition as a wirecoat or skim coat contacts the surface of the metallic cord; sufficient adhesion of the rubber composition to the metallic tire cord is important in performance of the tire. Interaction of the functionalized elastomer with the metal ions disposed on the surface of the metallic tire cord may enhance adhesion of the rubber composition to the metallic tire cord.

In one embodiment, the metal ion is added to the rubber composition as a metal disposed on the surface of a metalated short fiber. Suitable short fibers include those commonly used in rubber compositions, having a length ranging from 0.1 to 10 mm. In various embodiments, the metalated short fiber may be metalated polybisbenzoxazole fibers, metalated polyaramid fibers, metalated glass fibers, metalated carbon fibers, metalated polyamide fibers, metalated cellulose fibers, metalated polyester fibers, metalated rayon fibers, and metalated polyketone fibers. Suitable metalated short fibers include those disclosed in U.S. Publication 2010/0319827, fully incorporated herein by reference. The metalated short fibers are present in the rubber composition in an amount sufficient to impart the desired effect, such as a reinforcement effect or enhancement of the modulus. In one embodiment, the metalated short fibers are present in an amount ranging from 1 to 100 phr.

In one embodiment, the metal ion is added in the form of metal nanoparticles. Suitable nanoparticles include copper nanoparticles with particle sizes ranging from 10 to 100 nm, available from American Elements of Los Angeles, Calif.

In one embodiment, the metal ion is added to the rubber composition as a metal disposed on the surface of a metalated carbon black. Suitable metalated carbon black include aggregates of a carbon phase and a metal-containing species phase, for example as disclosed in U.S. Pat. No. 6,017,980, fully incorporated herein by reference. In one embodiment, the metalated carbon black is present in an amount ranging from 1 to 100 phr.

In one embodiment, the metal ion is added to the rubber composition as a metal diposed on the surface of a metalated silica. Suitable metalated silica include silica having metal diposed on the surface thereof, for example as disclosed in U.S. Pat. No. 7,943,693, fully incorporated herein by reference. In one embodiment, the metalated silica is present in an amount ranging from 1 to 100 phr.

The rubber composition may optionally include, in addition to the functionalized elastomer and the metal ion, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

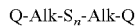

Q-Alk-S$_n$-Alk-Q        V in which Q is selected from the group consisting of

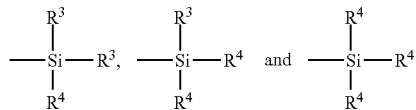

where R$^3$ is an alkyl group of 1 to 4 carbon atoms, cyclohexyl or phenyl; R$^4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl)disulfide and/or 3,3'-bis(triethoxysilylpropyl)tetrasulfide. Therefore, as to formula V, Q may be

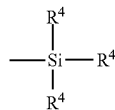

where R$^4$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 0.1 to about 5 phr. Lower amounts of zinc oxide may be used to avoid complexation with the functionalized elastomer. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire as are known in the art. For example, the rubber component may be a tread (including tread cap and tread base), sidewall, apex, chafer, sidewall insert, wirecoat or innerliner.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, functionalization of a styrene-butadiene rubber with 2-mercaptonaphthalene is illustrated to demonstrate the thiol-ene reaction.

To test the reactivity and reaction conditions of the styrene-butadiene rubber in a thiol-ene reaction, some reactions with a model thiol were made. The chosen thiol was 2-mercaptonaphthalene, from Aldrich.

Figure 3:
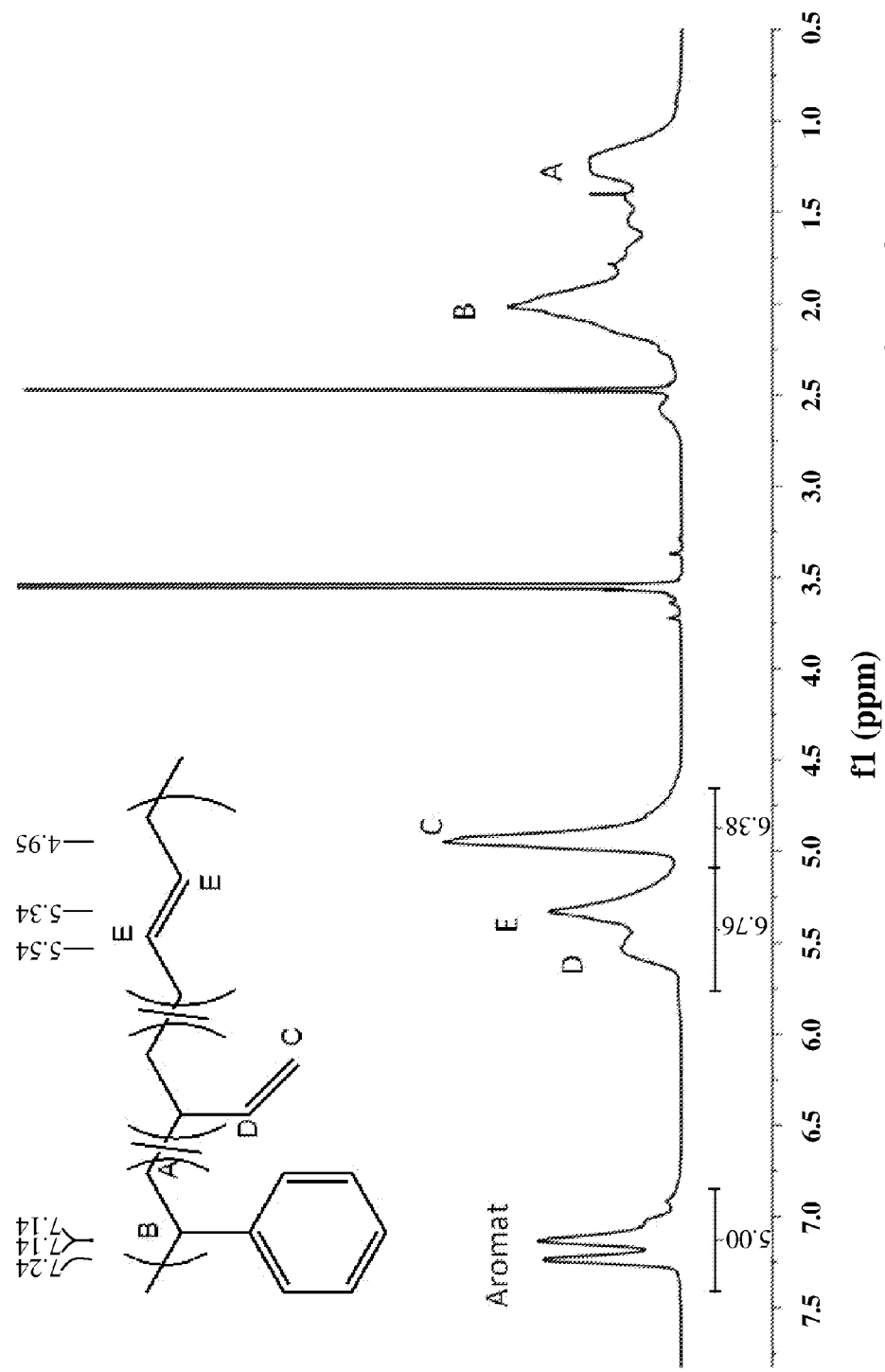
FIG. 3 shows the $^1$H-NMR spectrum of a styrene-butadiene elastomer.

The properties of the used styrene-butadiene rubber are summarized in Table 1. FIG. 3 shows the $^1$H-NMR spectrum of the elastomer.

TABLE 1

| | |
|---|---|
| Mooney (avg) | 27.6 |
| Finished Mooney | 23.1 |

TABLE 1-continued

| | |
|---|---|
| Tg (onset)/° C. | −21.74 |
| Tg (midpoint)/° C. | −17.52 |
| FTIR Styrene | 25.392 |
| FTIR Vinyl | 47.506 |
| FTIR Cis | 13.144 |
| FTIR Trans | 13.058 |
| Mn/g/mol | 124122 |
| Mw/g/mol | 207982 |
| Mz/g/mol | 327454 |
| PDI | 1.67 |

Synthesis of 2-mercaptonaphthalene Functionalized Rubber

This compound was synthesized twice, once with AIBN as initiator for the reaction and once with an acylphosphine oxide photoinitiator (Lucirin TPO).

For the reaction initiated by AIBN, 1 g of SBR was dissolved in 50 ml dry THF and 1.40 g of 2-mercaptonaphthalene and 0.14 g AIBN were added. The solution was degassed under a stream of argon for 2 hours and was then placed in a preheated oil bath at 75° C. The reaction was stirred for 14.5 hours at that temperature.

For the reaction initiated by the photoinitiator, a mixture of 1 g SBR, 1.40 g 2-mercaptonaphthalene and 0.30 g Lucirin TPO was degassed under a stream of argon for 2 hours and then was placed under a UV-lamp (320-380 nm) for 14.5 hours.

To make sure that no free thiol was present in the product, both reaction mixtures were dialyzed against THF for two days. Afterwards the solvent was evaporated and the product was dried under vacuum.

Figure 4:
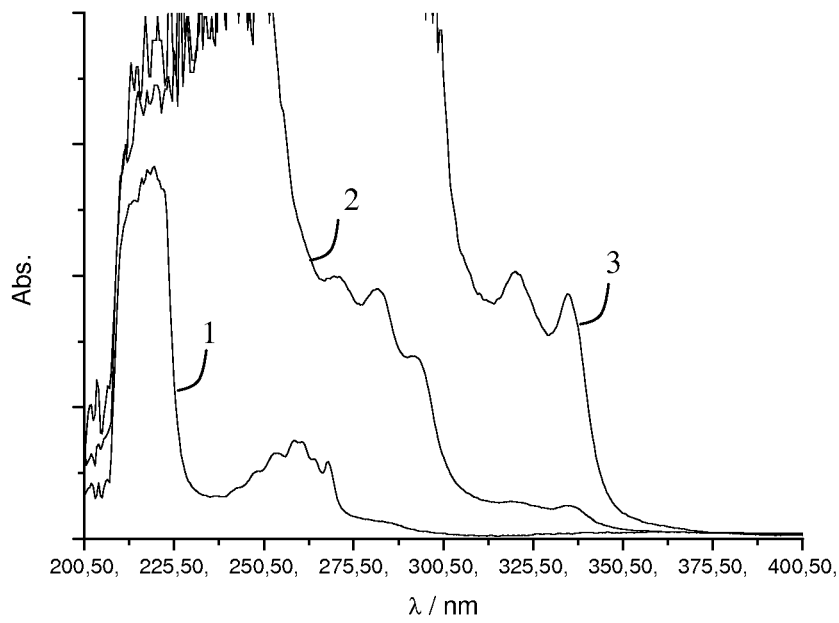
FIG. 4 shows the UV-vis spectrum of a styrene-butadiene elastomer before and after the reaction with 2-mercaptonaphtalene and the spectrum of the pure thiol.
Figure 5:
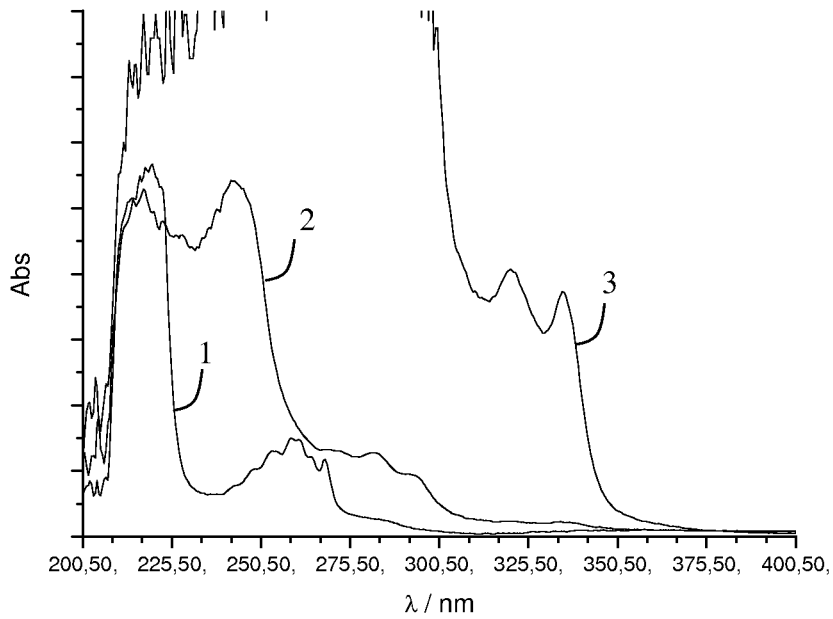
FIG. 5 shows the UV-vis spectrum of a styrene-butadiene elastomer before and after the reaction with 2-mercaptonaphtalene and the spectrum of the pure thiol.

FIG. 4 shows the UV-vis spectrum of the elastomer before (1) and after the reaction with 2-mercaptonaphtalene (2) and the spectrum of the pure thiol (3). Here the photoinitiator was used. FIG. 5 shows the same for the reaction which was initiated by AIBN, with the UV-vis spectrum of the elastomer before (1) and after the reaction with 2-mercaptonaphthanline (2) and the spectrum of the pure thiol (3).

Figure 6:
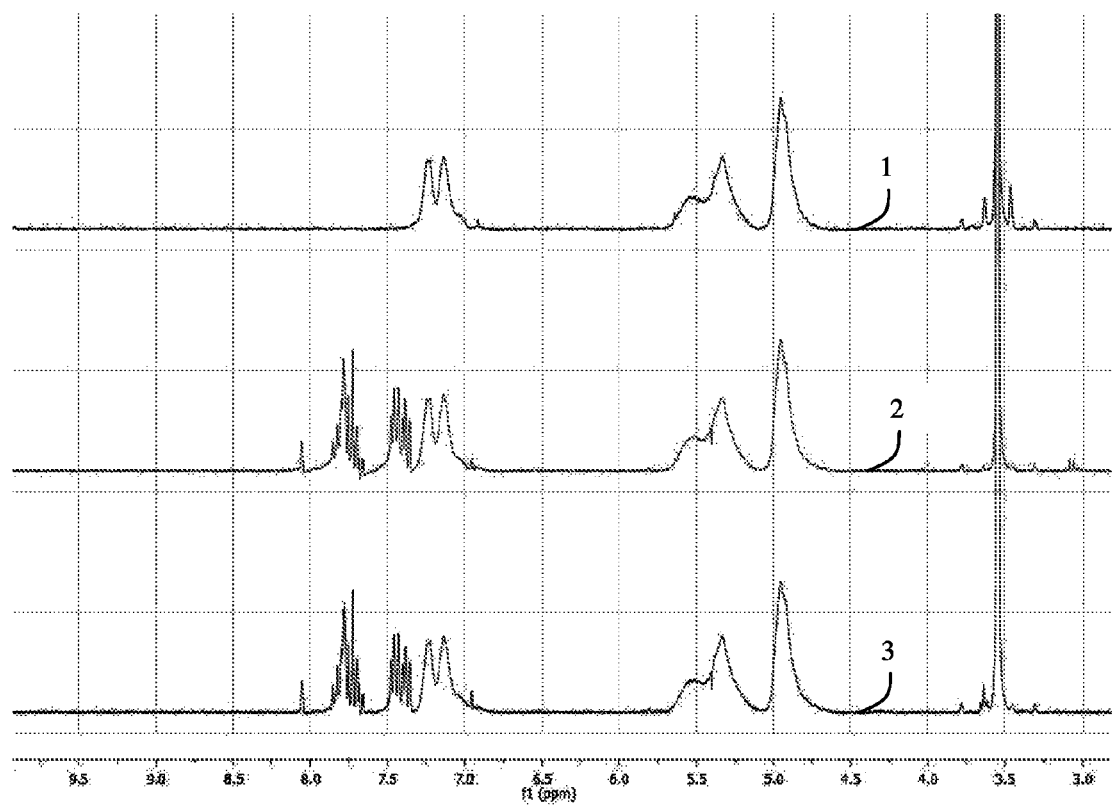
FIG. 6 shows the $^1$H-NMR spectrum of a styrene-butadiene elastomer before and after reaction with a thiol in the presence of different initiators.
Figure 7:
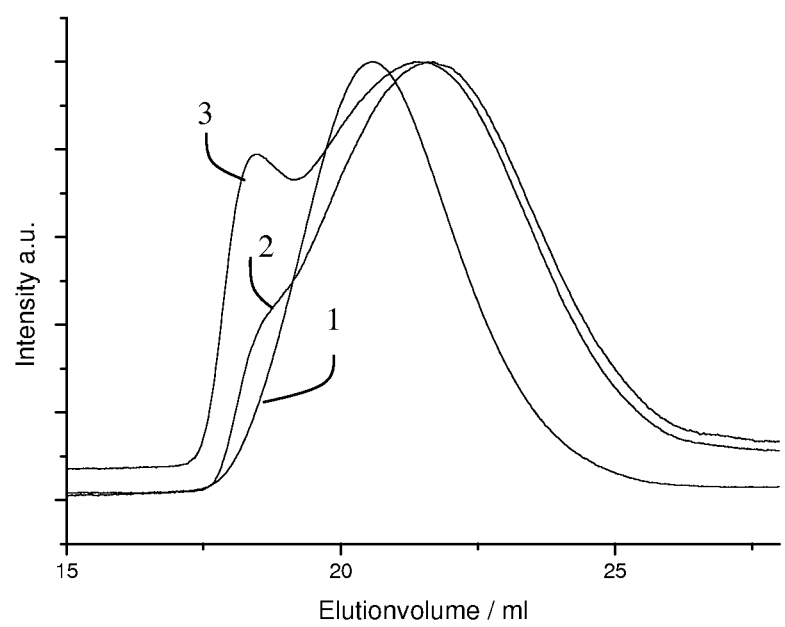
FIG. 7 shows a GPC-measurement for a styrene-butadiene elastomer, and the elastomer functionalized with a thiol in the presence of different initiators.

FIG. 6 shows the $^1$H-NMR spectrum of the elastomer before (1) and after reaction with the thiol in the presence of AIBN (2) and Lucirin (3). Compared to the H-NMR spectrum of the unfunctionalized rubber, there is an increase of the signals for the aromatic protons and a decrease for the vinyl groups after the polymer analogous reaction, confirming that the SBR was successfully functionalized with 2-mercaptonaphthalene. GPC-measurement (in THF) as shown in FIG. 7 for the SBR (1), the SBR functionlized in the presence of AIBN (2) and in the presence of Lucirin (3) confirmed that the product is not greatly cross linked. As seen in FIG. 7, especially the curve of the AIBN-initiated product (2) shows very little cross linking (small shoulder), so that the decrease of the signal of vinyl protons can be assigned to functionalization.

EXAMPLE 2

In this example, functionalization of a styrene-butadiene rubber with 6-(2,2';6',2"-terpyridin-4'-ylsulfanyl)hexane-1-thiole (formula IV) is illustrated.

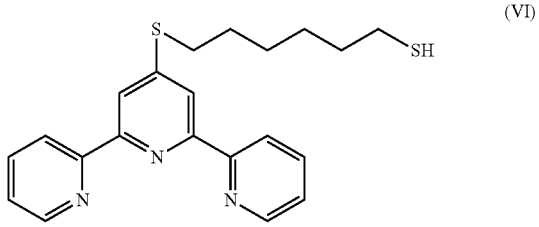 [SMILES: SCCCCCCSc1cc(-c2ccccn2)nc(-c2ccccn2)c1]

(VI)

Synthesis of 6-(2,2';6',2''-terpyridin-4'-ylsulfanyl)hexane-1-thiol

The terpyridine of formula VI was obtained in a 4 step reaction using literature procedures [U.S. Schubert, C. Eschbaumer, O. Hien, P. R. Andres, *Tetrahedron Lett.* 2001, 42, 4705; U.S. Schubert, S. Schmatloch, A. A. Precup, *Designed Monomers and Polymers* 2002, 5, 211.]. The yield and analysis at each step was as follows:

Step 1: 1,5-bis-(2'-pyridyl)-1,3,5-tricarbonyl pentane

Ethylpicolinate was reacted with acetone in the presence of NaH in tetrahydrofuran. The reaction mixture was refluxed for eight hours.

Yield: 41% yellow crystals $^1$H-NMR (CDCl$_3$/300 MHz): δ[ppm]: 2.10 (s, 4H); 7.24 (s, CDCl3); 7.40-7.44 (m, 2H); 7.84-7.95 (m, 4H); 8.76-8.77 (m, 2H)

Step 2: 2,6-bis-(2'-pyridyl)-4-pyridone

The product of step 1 was reacted with ammonium acetate with a 48 hour reflux.

Yield: 67% light pink crystals $^1$H-NMR (CDCl$_3$/300 MHz): δ[ppm]: 6.77 (s, 2H); 7.24 (s, CDCl3); 7.36-7.38 (m, 2H); 7.77-7.86 (m, 4H); 8.64-8.66 (m, 2H)

Step 3: 4'-chloro-2,2';6',2''-terpyridine

The product of step 2 was reacted with potassium pentachloride in phosphoryl chloride with a 24 hour reflux.

Yield: 55% light purple $^1$H-NMR (CDCl$_3$/300 MHz): δ[ppm]: 7.24 (s, CDCl3); 7.80-7.86 (m, 2H); 8.46 (s, 2H); 8.55 (t, 2H); 8.58 (t, 2H); 8.66-8.69 (m, 2H)

Step 4: 6-(2,2';6',2''-terpyridin-4'-ylsulfanyl)hexane-1-thiol

The product of step 3 was reacted with 1,6-hexanedithiol in the presence of potassium hydroxide in dimethylsulfoxide.

Yield: 35% colorless crystals $^1$H-NMR (CDCl$_3$/300 MHz): δ[ppm]: 1.32-1.63 (m, 4H), 1.79-1.88 (m, 4H), 3.63 (q, 2H), 4.7 (t, 2H), 7.24 (s, CDCl3); 7.27-7.32 (m, 2H); 7.78-7.84 (m, 2H); 7.96 (s, 2H); 8.56-8.65 (m, 4H)

The styrene butadiene rubber of Example 1 was functionalized with 6-(2,2;6',2''-terpyridin-4'-ylsulfanyl)hexane-1-thiol following the procedures of Example 1 for 2-mercaptonaphthalene.

Figure 8:
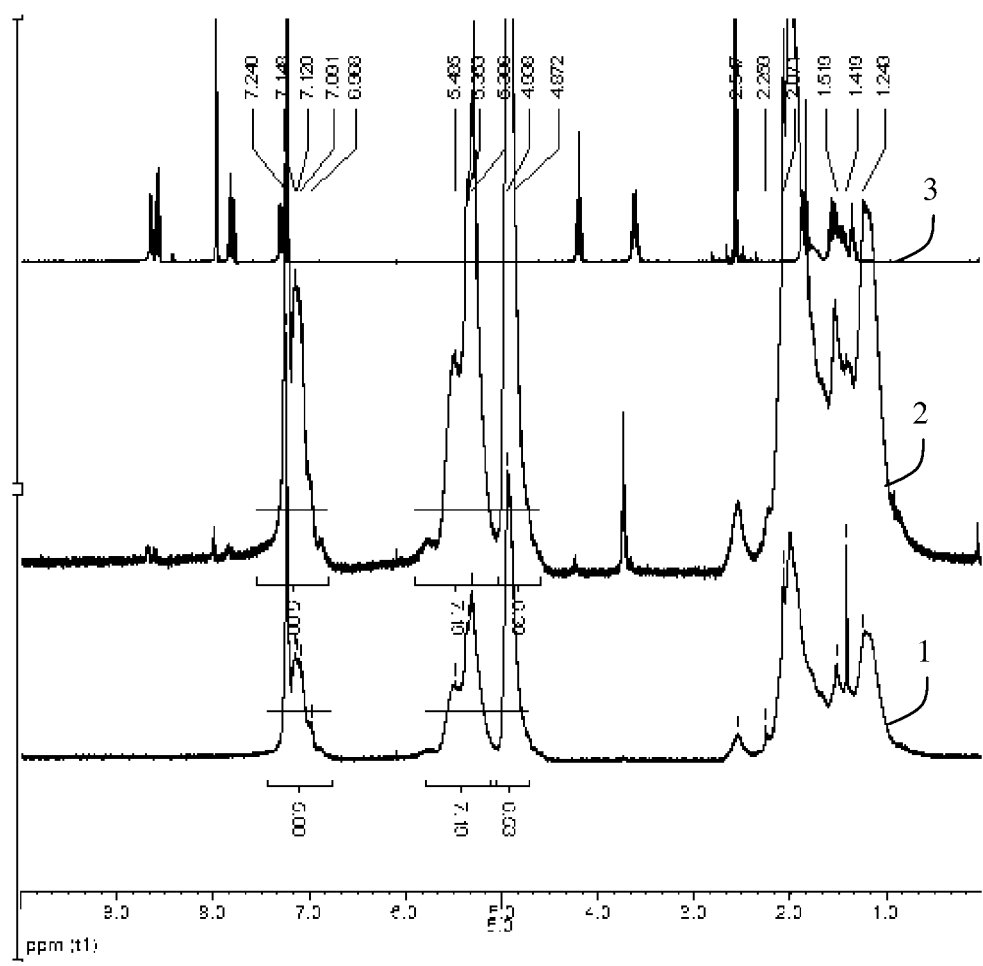
FIG. 8 shows an $^1$H-NMR of an unfunctionalized styrene-butadiene elastomer compared to the elastomer functionalized with a terpyridine ligand.
Figure 9:
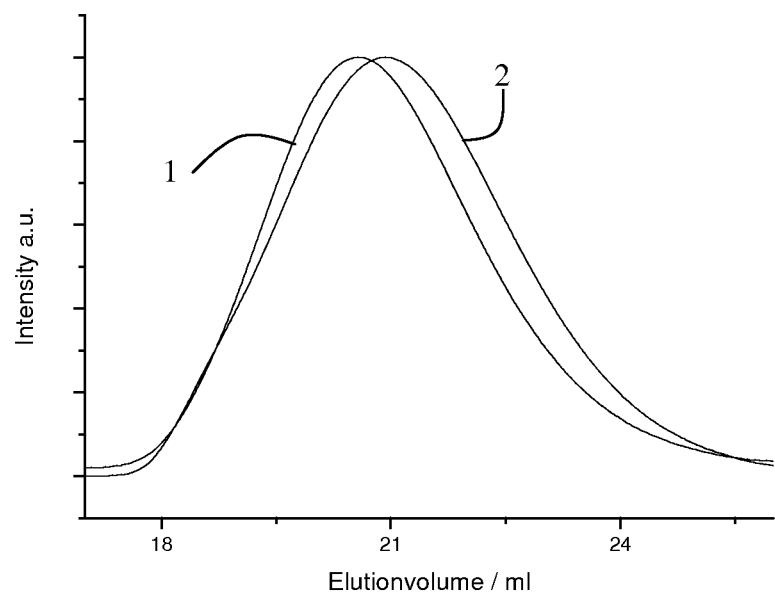
FIG. 9 shows a GPC graph for an unfunctionalized styrene-butadiene elastomer compared to the elastomer functionalized with a terpyridine ligand.

FIG. 8 shows the $^1$H-NMR of the unfunctionalized elastomer (1) compared to the rubber functionalized with the terpyridine ligand (2), and the terpyridine (3). As seen in FIG. 8, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization. FIG. 9 shows a GPC graph for the SBR (1) and the functionalized SBR (2). As seen in FIG. 9, essentially no change in molecular weight could be observed in the GPC measurement, so that the reduction of vinylprotons can be assigned to functionalization.

EXAMPLE 3

In this example, functionalization of a styrene-butadiene rubber with 4'-mercapto-2,2':6',2''-terpyridine (formula VII) is illustrated

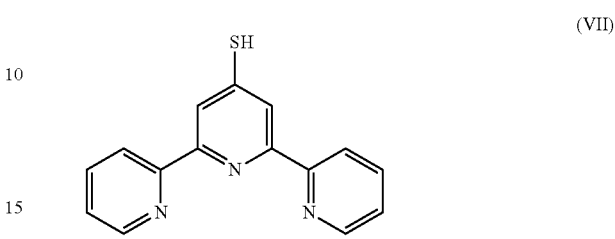

(VII)

Synthesis of –4'-mercapto-2,2':6',2''-terpyridine

The terpyridine of formula VII was obtained using the 4 step procedure as given in Example 2, with the modification that in step 4, the 4'-chloro-2,2';6',2''-terpyridine product of step 3 was reacted with sodium hydrogensulfide (NaSH) in the presence of potassium hydroxide in dimethylformamide (DMF).

Yield: 88%

The styrene butadiene rubber of Example 1 was functionalized with 4'-mercapto-2,2':6',2''-terpyridine following the procedures of Example 1 for 2-mercaptonaphthalene.

Figure 10:
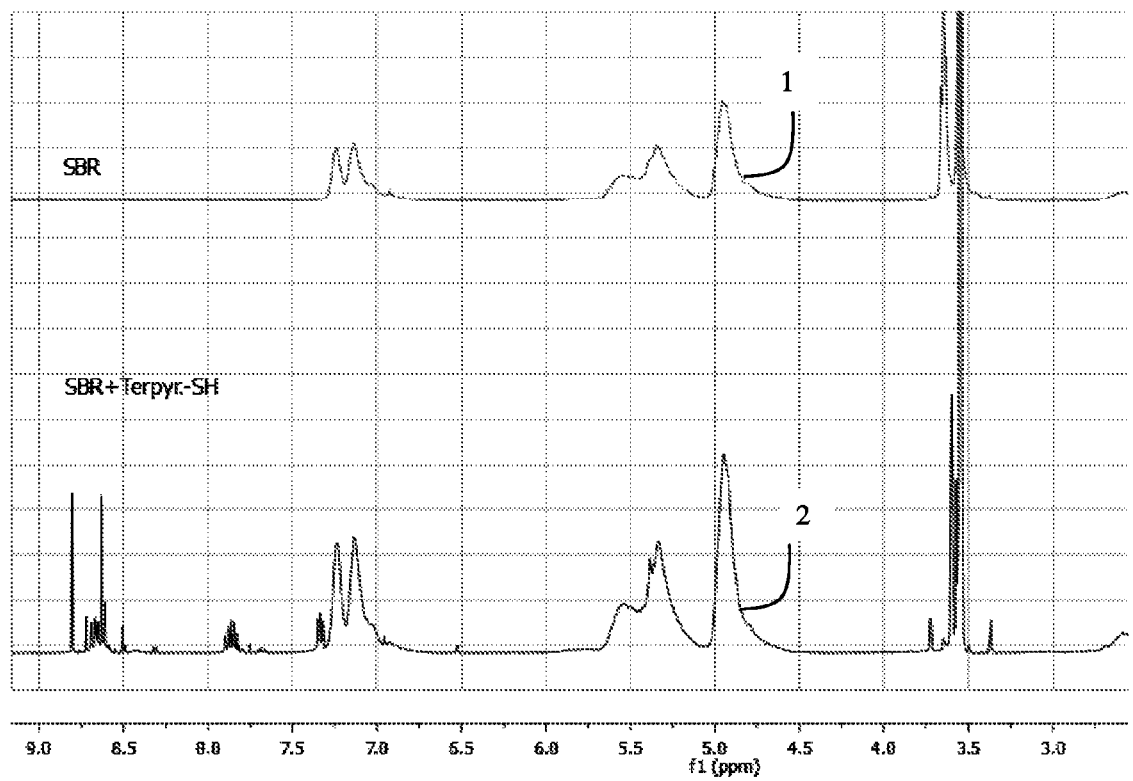
FIG. 10 shows an $^1$H-NMR of an unfunctionalized styrene-butadiene elastomer compared to the elastomer functionalized with a terpyridine ligand.

FIG. 10 shows the $^1$H-NMR of the unfunctionalized elastomer (1) compared to the rubber functionalized with the terpyridine ligand (2). As seen in FIG. 9, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

EXAMPLE 4

In this example, functionalization of a styrene-butadiene rubber with 4'-(4-mercaptomethylphenyl)-2,2':6,2''-terpyridine (formula VIII) is illustrated.

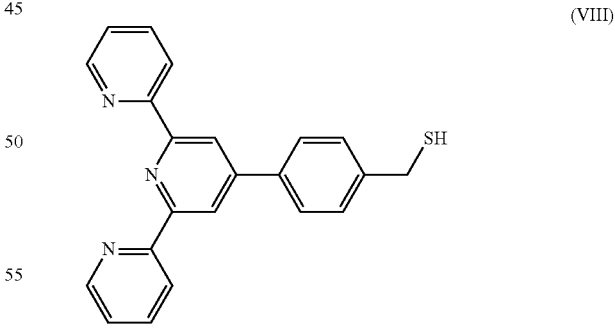

(VIII)

Synthesis of 4'-(4-mercaptomethylphenyl)-2,2':6,2''-terpyridine

Figure 11:
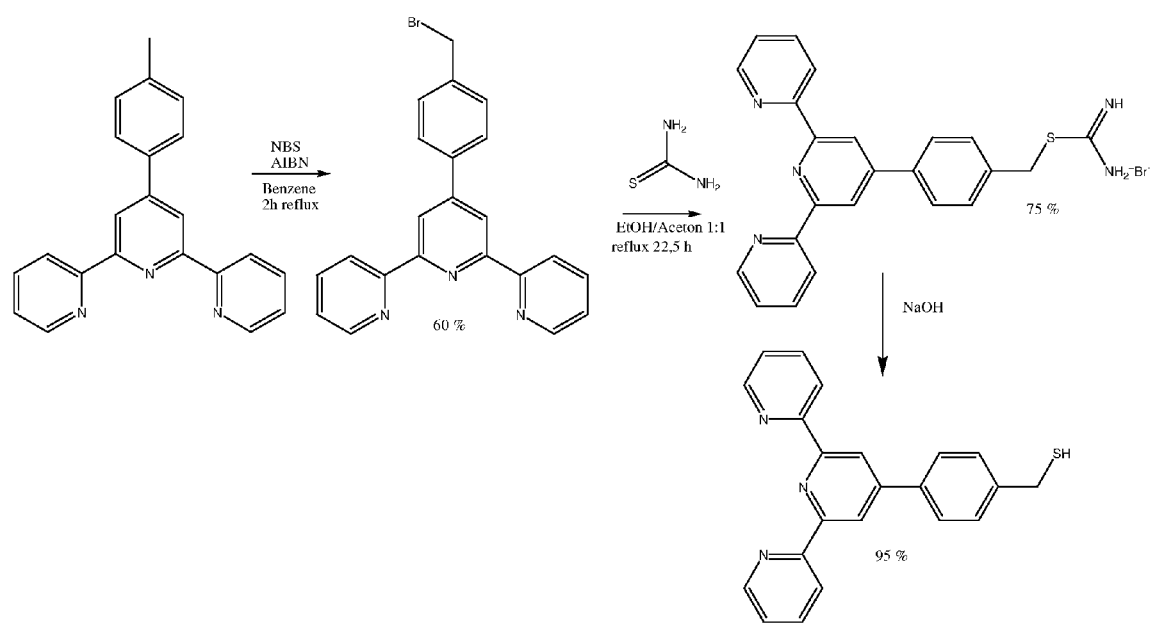
FIG. 11 a synthesis scheme for synthesis of a terpyridine ligand.

The terpyridine of formula VIII was obtained following a synthesis route as shown in FIG. 11.

Step 1: 4'-methylphenyl-2,2':6,2''-terpyridine

[X. J. Zhang, D. Li, X. P. Zhou, *New J. Chem.* 2006, 30, 706.]

4.6 g (0.115 mol) NaOH was mixed with 6.4 g (0.05 mol) p-tolylaldehyde and 12.8 g (0.10 mol) 2-acetylpyridine in a mortar, until a yellow powder was produced. The powder was transferred to a flask which contained 35 g ammonia acetate (excess) and 90 ml acetic acid (100%). The mixture was heated under reflux for three hours. Afterwards 50 ml ethanol and 68 ml water were added. Upon cooling the red solution the product crystallized. It was recrystallized from ethanol twice.

Yield: 65% light yellow crystals $^1$H-NMR (CDCl$_3$/300 MHz): δ[ppm]: 2.41 (s, 3H); 7.29-7.37 (m, 4H); 7.81 (d, 2H); 7.87 (td, 2H); 8.66 (d, 2H); 8.71-8.73 (m, 4H)

Step 2: 4'-(4-bromomethylphenyl)-2,2':6,2"-terpyridine 7.07 g 4'-methylphenyl-2,2':6,2"-terpyridine, 0.28 g AIBN and 4.67 g N-Bromsuccinimide were dissolved in 70 ml benzene and heated under refux for 6 hours. The resulting suspension was filtered hot to remove the succinimide. The solvent of the filtrate was evaporated and the resulting solid was recrystallized from ethanol/aceton 2:1.

Yield: 60% dark yellow crystals $^1$H-NMR (CDCl$_3$/300 MHz): δ[ppm]: 4.55 (s, 2H); 7.33-7.38 (m, 2H); 7.52 (d, 2H); 7.85-7.92 (m, 4H); 8.66 (td, 2H); 8.71-8.73 (m, 4H)

Step 3: 4'-(4-isothiouroniumbromidemethylphenyl)-2,2':6,2"-terpyridine

This step was carried out according to the literature procedure [G. C. Zhou, Harruna, II, *Macromolecules* 2005, 38, 4114].

Yield: 75%

Step 4: 4'-(4-mercaptomethylphenyl)-2,2':6,2"-terpyridine

This step was carried out according to the literature procedure [G. C. Zhou, Harruna, II, *Macromolecules* 2005, 38, 4114].

Yield: 95%

$^1$H-NMR (CDCl$_3$/300 MHz): δ[ppm]: 3.69 (s, 2H); 7.28-7.38 (m, 4H); 7.81-7.88 (m, 4H); 8.61-8.70 (m, 6H)

The styrene butadiene rubber of Example 1 was functionalized with 4:4'-(4-mercaptomethylphenyl)-2,2%6,2"-terpyridine following the procedures of Example 1 for 2-mercaptonaphthalene.

Figure 12:
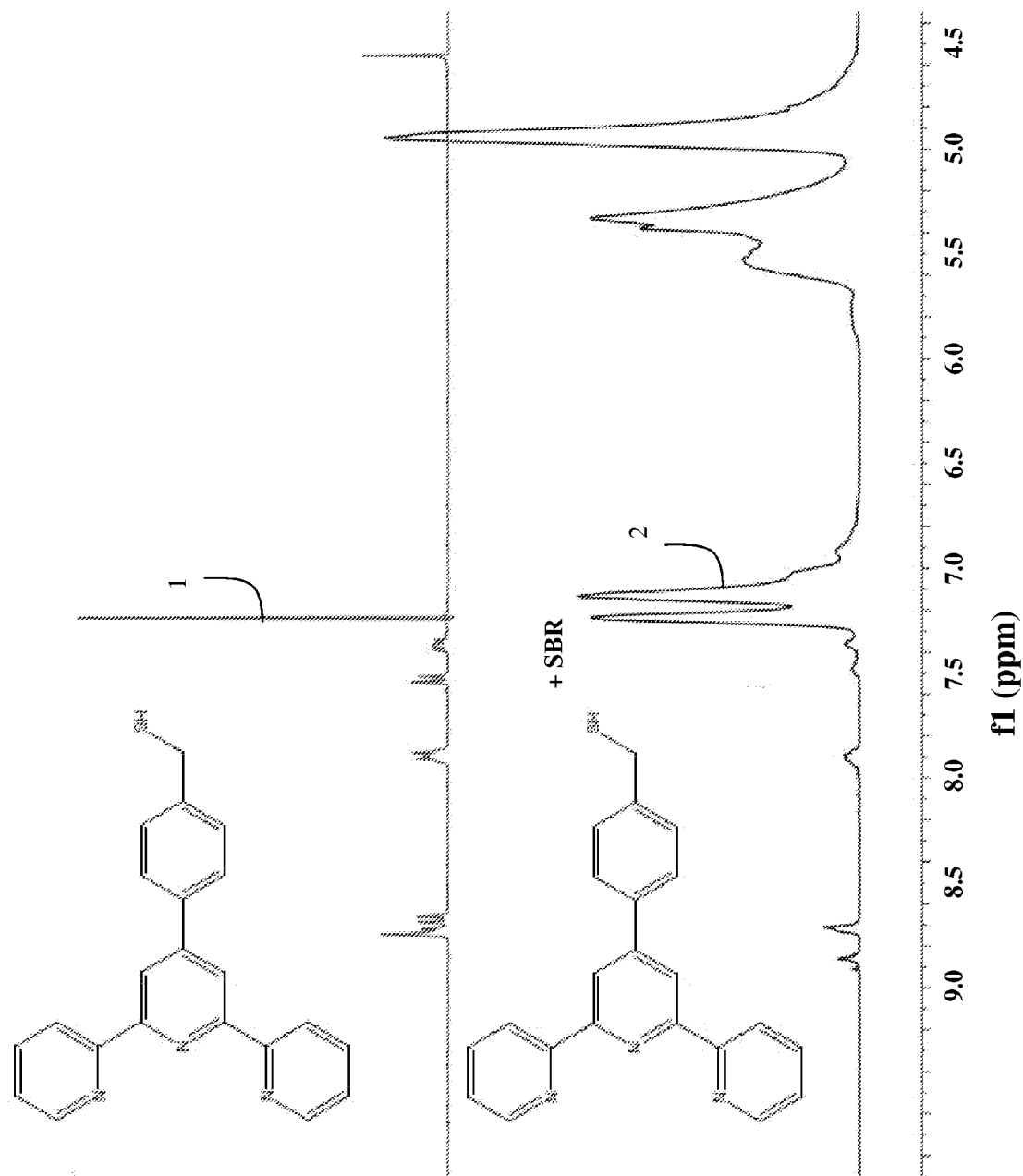
FIG. 12 shows an $^1$H-NMR of a terpyridine ligand compared to a styrene-butadiene elastomer functionalized with the terpyridine ligand.

FIG. 12 shows the $^1$H-NMR of the rubber functionalized with the terpyridine ligand (2), and the terpyridine (1). As seen in FIG. 11, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

EXAMPLE 5

In this example, the effect of adding a iron salt to a functionalized elastomer is illustrated. A rubber cement was prepared by adding 0.4 g of the functionalized elastomer of Example 4 to 4 ml of THF in a small vial. The rubber cement was combined with 0.02 g of FeSO$_4$.7H$_2$O and the vial was shaken for 7 hours. Visual inspection of the rubber cement/metal salt mixture showed a purple color, as compared with the colorless rubber cement.

Figure 13:
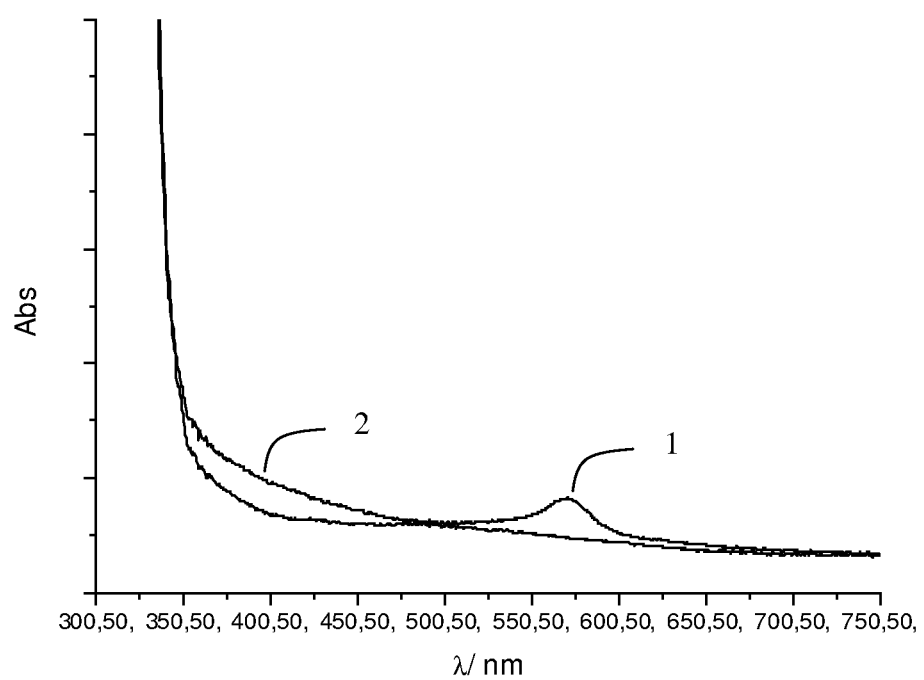
FIG. 13 shows UV-vis spectra for a rubber cement/iron salt mixture and for rubber cement.

UV-vis spectra for the rubber cement/metal salt and rubber cement are shown in FIG. 13. As seen in FIG. 13, the rubber cement/metal salt spectrum (2) shows an absorbance peak at about 571 nm, indicating the formation of a coordination complex between the terpyridine moieties of the functionalized elastomer and the Fe$^{2+}$ ion. The rubber cement spectrum (1) shows no such peak.

EXAMPLE 6

In this example, the effect of adding a ruthenium salt to a functionalized elastomer is illustrated. A rubber cement was prepared by adding 0.03 g of the functionalized elastomer of Example 4 to 5 ml THF and 0.25 ml MeOH in a small vial. The rubber cement was combined with 0.02 g of RuCl$_3$ and the vial was heated up to 65° C. for 20 hours and shaken. Visual inspection of the rubber cement/metal salt mixture showed a dark red color, as compared with the colorless rubber cement.

Figure 14:
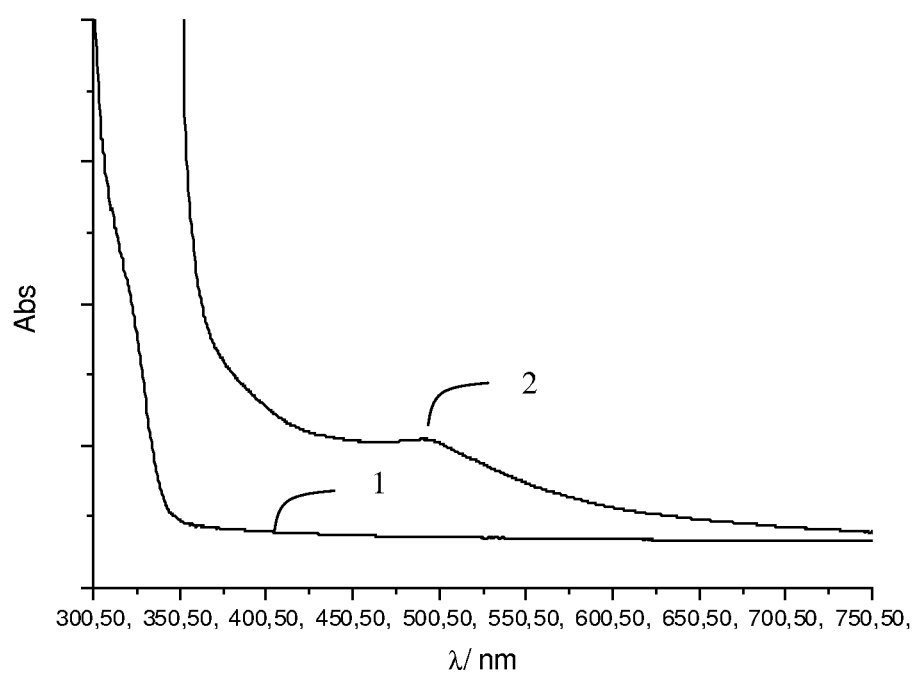
FIG. 14 shows UV-vis spectra for a rubber cement/ruthenium salt mixture and for a rubber cement.

UV-vis spectra for the rubber cement/metal salt and rubber cement are shown in FIG. 14. As seen in FIG. 14, the rubber cement/metal salt spectrum (2) shows an absorbance peak at about 490 nm, indicating the formation of a coordination complex between the terpyridine moieties of the functionalized elastomer and the Ru$^{2+}$ ion. The rubber cement spectrum (1) shows no such peak.

What is claimed is:

1. A pneumatic tire comprising a rubber composition comprising
   a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and
   a metal ion.

2. A pneumatic tire comprising a rubber composition comprising a functionalized diene-based elastomer of formula I

wherein X is a polymer derived from a monomer comprising at least one conjugated diene monomer and optionally at least one vinyl aromatic monomer,
   Z comprises a multidentate ligand group capable of complexing with a metal ion,
   Y is a divalent group bonded to both X and Z,
   n is the number of ─[─Y─Z] groups bonded to X; and
   a metal ion comprising:
   1) copper disposed on the surface of a steel tire cord, and wherein the rubber composition is in contact with the steel tire cord; or
   2) a metalated filler selected from the group consisting of a metalated carbon black and a metalated silica; or
   3) a metalated short fiber.

3. The pneumatic tire of claim 2, wherein the metal ion comprises a metal salt.

4. The pneumatic tire of claim 2, wherein the metal ion is selected from the group consisting of Cu$^{2+}$, Fe$^{2+}$, Co$^{2+}$, Ni$^{2+}$, Zn$^{2+}$ and Ru$^{2+}$.

5. The pneumatic tire of claim 2, wherein the metal ion comprises a metal nanoparticle.

6. The pneumatic tire of claim 2, wherein Z comprises a ligand selected from the group consisting of substituted bipyridinyl groups, unsubstituted bipyridinyl groups, substituted terpyridinyl groups, unsubstituted terpyridinyl groups, substituted phenanthrolinyl groups, unsubstituted phenanthrolinyl groups, substituted pyrazinyl groups, and unsubstituted pyrazinyl groups.

7. The pneumatic tire of claim 6, where Y is divalent sulfur.

8. The pneumatic tire of claim 2, wherein Z comprises a ligand of formula II, III or IV

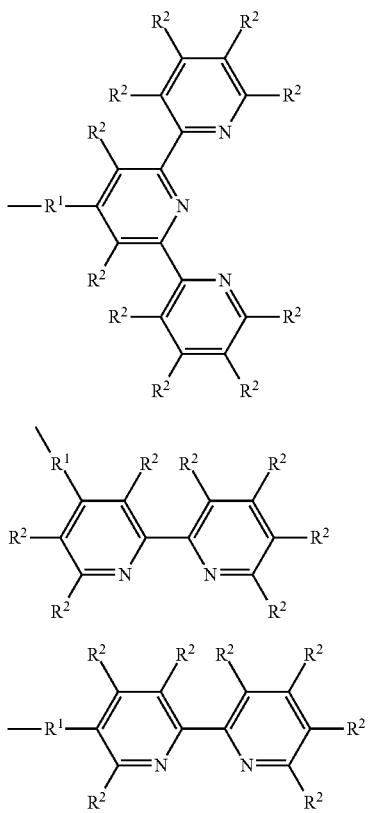

where $R^1$ forms the linkage from Z to Y in formula I and $R^1$ is a covalent bond, C2 to C8 linear alkylene, arylene, alkyl substituted arylene, aryl substituted alkylene, thioalkylene, or thioarylene, and $R^2$ are independently selected from the group consisting of hydrogen, C2 to C6 linear alkyl, and C2 to C6 branched alkyl.

9. The pneumatic tire of claim 2, where Y is divalent sulfur.

10. The pneumatic tire of claim 2, wherein Z comprises a ligand selected from the group consisting of substituted 2,2';6,'2"-terpyridinyl groups, unsubstituted substituted 2,2';6,'2"-terpyridinyl groups, substituted 2,2'-bipyridinyl groups, and unsubstituted 2,2'-bipyridinyl groups.

11. The pneumatic tire of claim 2, wherein —[Y—Z] group is selected from the group consisting of 6-(2,2';6',2"-terpyridin-4'-ylsulfanyl)hexyl-1-sulfanyl, 2,2';6',2"-terpyridin-4'-ylsulfanyl, and 4-(2,2';6',2"-terpyridin-4'-yl)phenylmethylsulfanyl.

12. The pneumatic tire of claim 2, wherein X is selected from the group consisting of styrene-butadiene rubbers, polybutadiene rubbers, and polyisoprene rubbers.

13. The pneumatic tire of claim 2, wherein n ranges from 2 to 30.

* * * * *